US009903452B2

(12) United States Patent
Tseng

(10) Patent No.: US 9,903,452 B2
(45) Date of Patent: Feb. 27, 2018

(54) STRUCTURE OF LINEAR ACTUATOR

(71) Applicant: MOTECK ELECTRIC CORP., New Taipei (TW)

(72) Inventor: Hsien-Te Tseng, New Taipei (TW)

(73) Assignee: MOTECK ELECTRIC CORP., New Taipei (TW)

( * ) Notice: Subject to any disclaimer, the term of this patent is extended or adjusted under 35 U.S.C. 154(b) by 350 days.

(21) Appl. No.: 14/882,029

(22) Filed: Oct. 13, 2015

(65) Prior Publication Data

US 2016/0146317 A1 May 26, 2016

(30) Foreign Application Priority Data

Nov. 21, 2014 (TW) .............................. 103220718 U

(51) Int. Cl.
*F16H 25/00* (2006.01)
*F16H 25/24* (2006.01)
*F16C 19/30* (2006.01)
*F16H 25/20* (2006.01)
*F16C 35/077* (2006.01)
*F16C 19/32* (2006.01)
*F16C 19/49* (2006.01)

(52) U.S. Cl.
CPC ........ *F16H 25/2454* (2013.01); *F16C 19/305* (2013.01); *F16C 19/32* (2013.01); *F16C 19/49* (2013.01); *F16C 35/077* (2013.01); *F16H 2025/204* (2013.01); *F16H 2025/209* (2013.01); *F16H 2025/2031* (2013.01)

(58) Field of Classification Search
CPC ......... F16H 25/2454; F16H 2025/2031; F16H 2025/204; F16H 2025/209; F16C 19/49; F16C 19/32
See application file for complete search history.

(56) References Cited

U.S. PATENT DOCUMENTS

| 2,898,888 | A | * | 8/1959 | Geyer | ..................... | F15B 15/20 |
| | | | | | | 74/89.25 |
| 3,765,260 | A | * | 10/1973 | Lucas | ..................... | F16H 35/10 |
| | | | | | | 74/405 |
| 6,240,797 | B1 | * | 6/2001 | Morishima | ......... | F16H 25/2454 |
| | | | | | | 188/134 |
| 2004/0093969 | A1 | * | 5/2004 | Nielsen | ................ | A47C 20/041 |
| | | | | | | 74/89.23 |
| 2007/0144281 | A1 | * | 6/2007 | Inoue | .................. | F16H 25/2015 |
| | | | | | | 74/89.23 |

(Continued)

*Primary Examiner* — David M Fenstermacher
(74) *Attorney, Agent, or Firm* — Muncy, Geissler, Olds & Lowe, P.C.

(57) ABSTRACT

An improved structure of linear actuator includes an actuator including a gear set having a friction portion located at the periphery of the gear shaft of a driven gear thereof, a one-way bearing mounted on the gear shaft for rubbing against the friction portion to brake the driven gear from reverse rotation, a driver for driving the gear set and a transmission mechanism including a lead screw coaxially coupled to and rotatable by the gear shaft of the driven gear and a retractable tube assembly coupled to the lead screw and movable by the lead screw between an extended position and a received position, and a stopping mechanism including a thrust bearing coupled to the gear shaft of the driven gear and stoppable against an inner race of the one-way bearing inner race to bear an axial thrust load.

8 Claims, 6 Drawing Sheets

(56) References Cited

U.S. PATENT DOCUMENTS

2012/0325036 A1* 12/2012 Harada .................. B21J 5/12
74/424.86
2014/0326094 A1* 11/2014 Bunder ................ F16H 61/68
74/335

* cited by examiner

STRUCTURE OF LINEAR ACTUATOR

This application claims the priority benefit of Taiwan patent application number 103220718, filed on Nov. 21, 2014.

BACKGROUND OF THE INVENTION

1. Field of the Invention

The present invention relates to linear actuator technology and more particularly, to improved structure of linear actuator, which has a gear shaft of a gear set of the actuator thereof supported in a one-way bearing and a thrust bearing, so that when a driver drives the gear set to rotate a lead screw in moving a retractable tube assembly between an extended position and a received position, the thrust bearing mates with the one-way bearing to bear an axial thrust load, preventing actuator damage and enhancing structural stability.

2. Description of the Related Art

Many different types of linear actuators with different mechanical and transmission designs are known for use in medical or home beds, massage chairs, fitness machines, rehabilitation equipments, door/window openers, lifting mechanisms and many other electrically controllable displacement devices for elevation or angular position adjustment. During the operation of the motor in a conventional linear actuator, a linked retractable tube is moved between an extended position and a received position to achieve elevation or angular position adjustment.

Commercial linear actuators commonly use a motor to drive a worm in rotating a worm gear and a lead screw, moving a retractable tube linearly to lift or lower a coupled link or bracket. However, during the operation of the worm to rotate the worm gear and the connected lead screw in moving the linked retractable tube, the torsional force thus generated is large. When stopping the actuator, the load can cause the lead screw to rotate in the reversed direction, and the retractable tube (or external apparatus) can fall suddenly, causing an accident. In order to prevent this problem, a brake can be added to the actuator to lock the actuator when it is stopped. Further, if the linear actuator bears an impact due to a sudden change in load or any other factor, a large axial thrust load and high impact load will be given to the retractable tube against the lead screw, leading to actuator damage. An improvement in this regard is desired.

SUMMARY OF THE INVENTION

The present invention has been accomplished under the circumstances in view. It is one object of the present invention to provide improved structure of linear actuator, which eliminates the drawbacks of the aforesaid prior art designs.

To achieve this and other objects of the present invention, an improved structure of linear actuator comprises an actuator and a stopping mechanism. The actuator comprises a hollow holder frame, a gear set mounted in the hollow holder frame and having a friction portion located at the periphery of the gear shaft of a driven gear thereof, a one-way bearing mounted on the gear shaft for rubbing against the friction portion to brake the driven gear from reverse rotation, a driver for driving the gear set, and a transmission mechanism comprising a lead screw coaxially coupled to and rotatable by the gear shaft of the driven gear and a retractable tube assembly coupled to the lead screw and movable by the lead screw between an extended position and a received position. The stopping mechanism comprises a thrust bearing coupled to the gear shaft of the driven gear and stoppable against an inner race of the one-way bearing to bear an axial thrust load. Thus, if the actuator receives an impact due to a sudden change in load or any other factor, the thrust bearing mates with the one-way bearing to bear the axial thrust load and high impact load, avoiding actuator damage and assuring structural stability. Further, the one-way bearing and the thrust bearing are general specification products, they are easy and inexpensive to manufacture.

Further, the hollow holder frame of the actuator is configured to provide a locating groove in the accommodation chamber. Further, the stopping mechanism further comprises a receptacle mounted in the locating groove of the hollow holder frame. The receptacle comprises an open-top chamber that accommodates the one-way bearing to support the gear shaft of the driven gear, and a recessed position-limit groove located in a bottom side of the open-top chamber for accommodating the thrust bearing. Thus, the thrust bearing is stopped against the inner race of the one-way bearing to mate with the receptacle for bearing axial thrust load and high impact load. Because the thrust bearing and the receptacle are mounted inside the hollow holder frame without occupying any external space of the actuator, increasing the flexibility of the overall design and application of the linear actuator. Further, the low friction characteristic of the thrust bearing facilitates smooth rotation of the one-way bearing and the driven gear.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
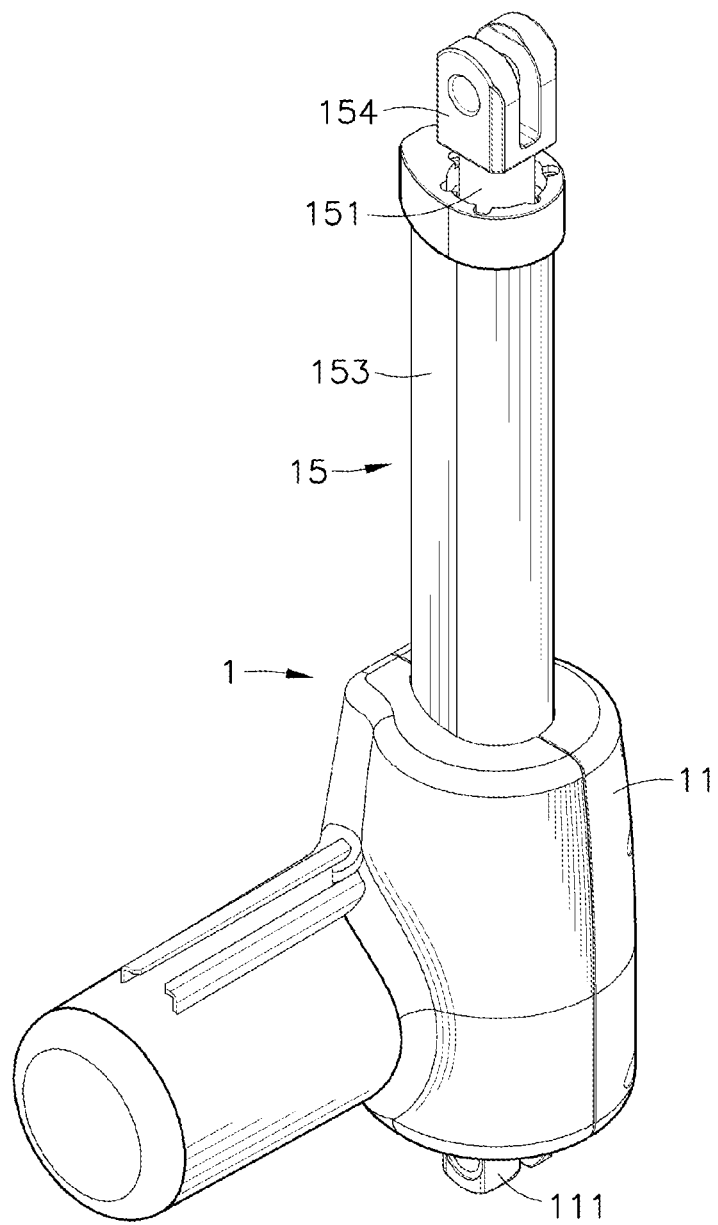
FIG. 1 is an oblique top elevational view of an improved structure of linear actuator in accordance with the present invention.
Figure 2:
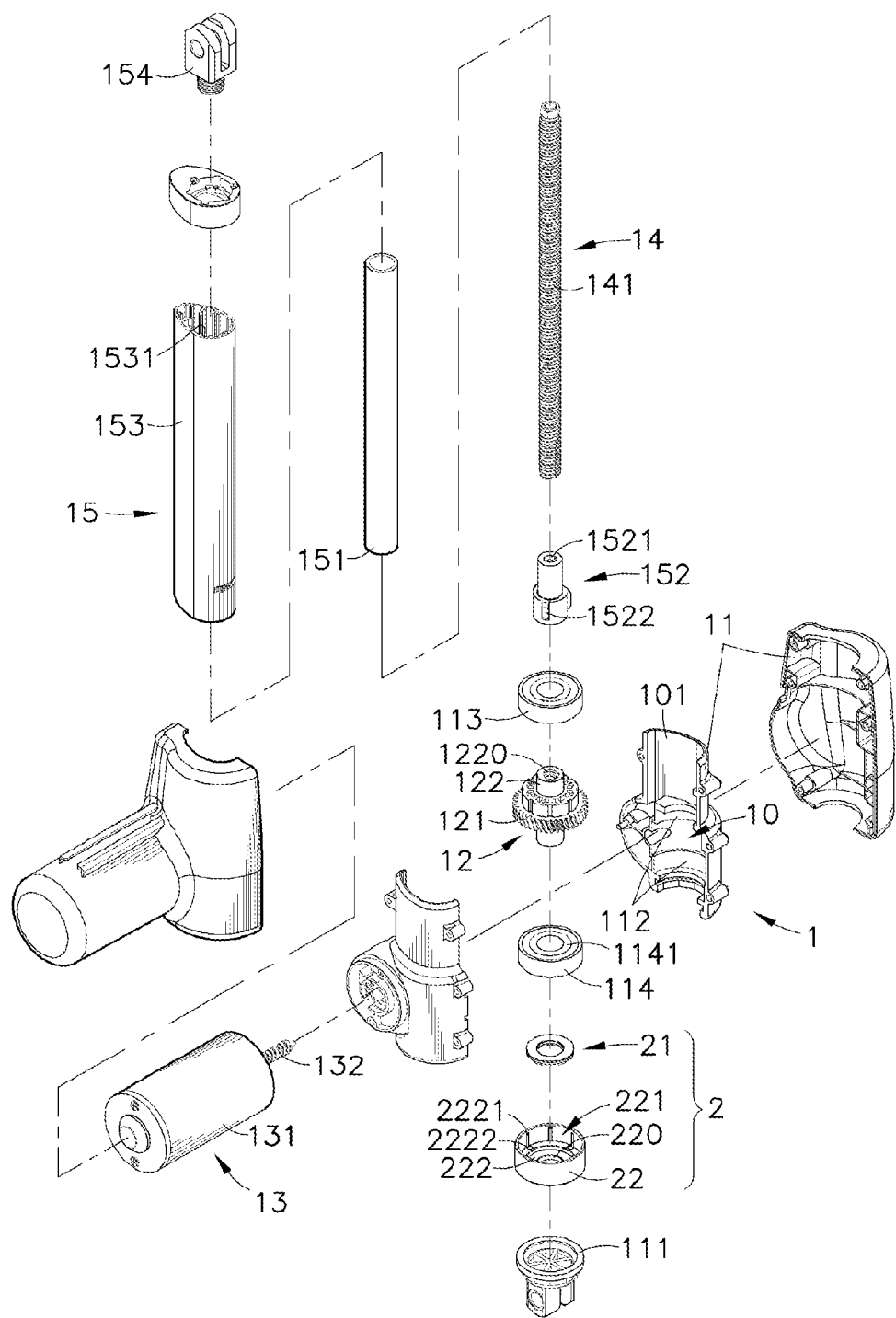
FIG. 2 is an exploded view of the improved structure of linear actuator in accordance with the present invention.
Figure 3:
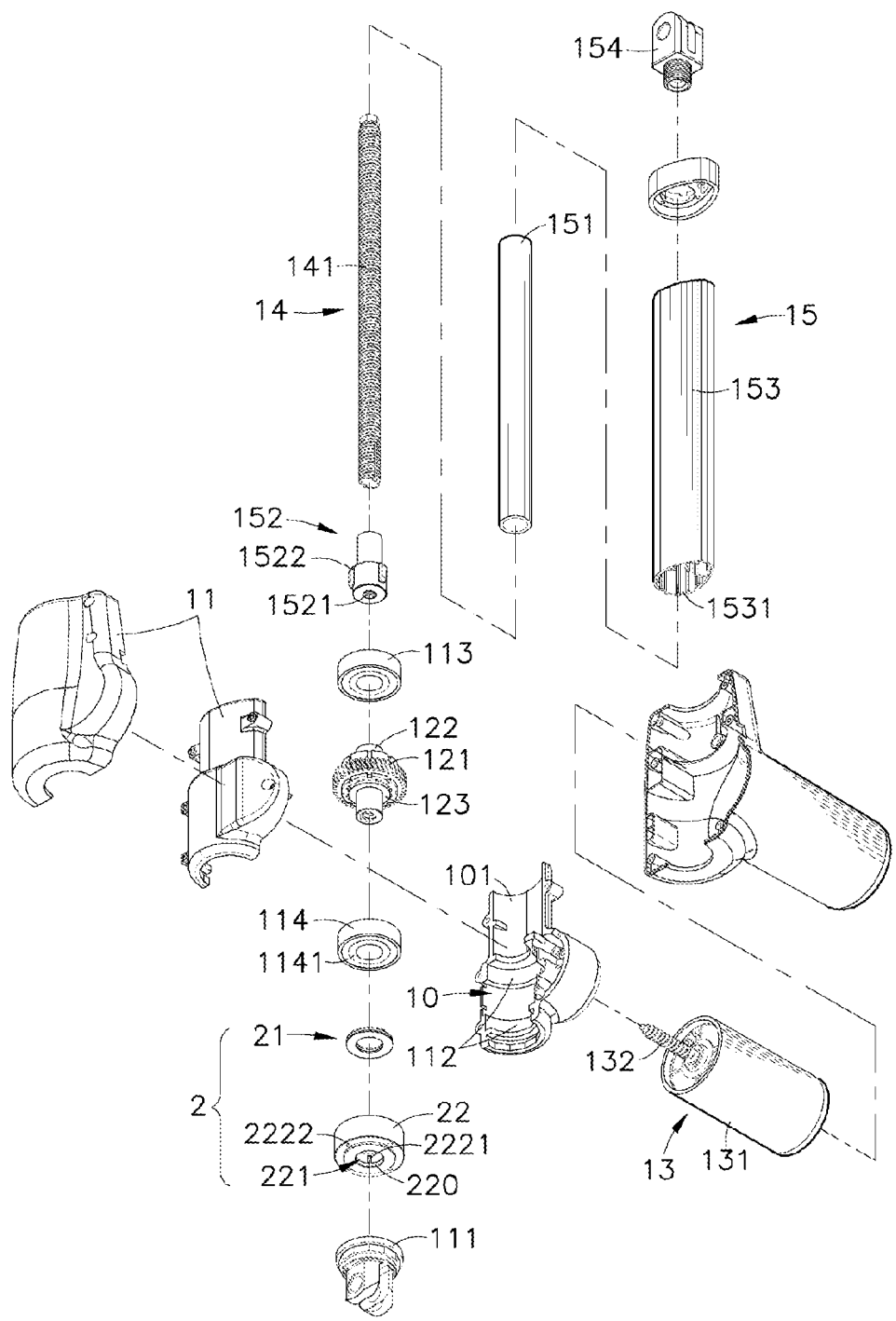
FIG. 3 corresponds to FIG. 2 when viewed from another angle.
Figure 4:
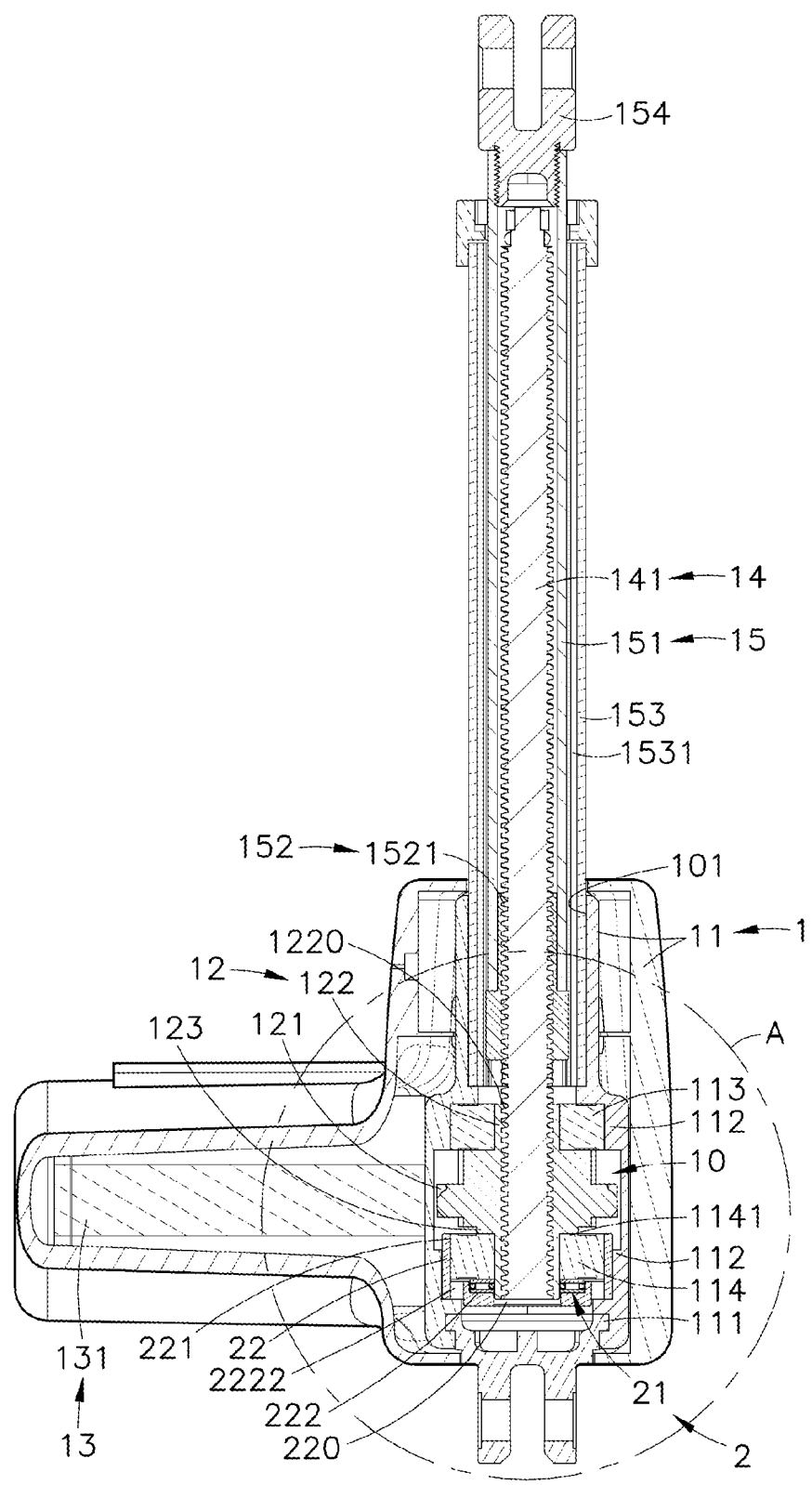
FIG. 4 is a sectional side view of the improved structure of linear actuator in accordance with the present invention.
Figure 5:
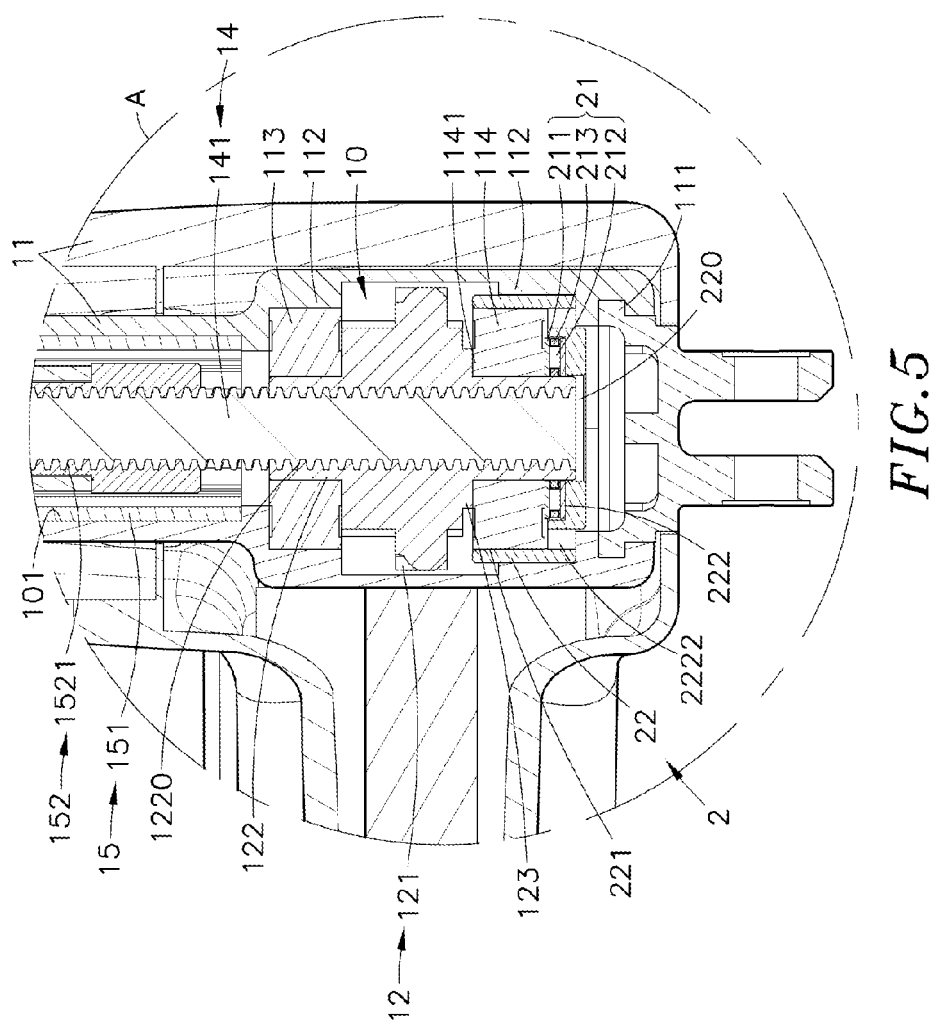
FIG. 5 is an enlarged view of a part of FIG. 4.
Figure 6:
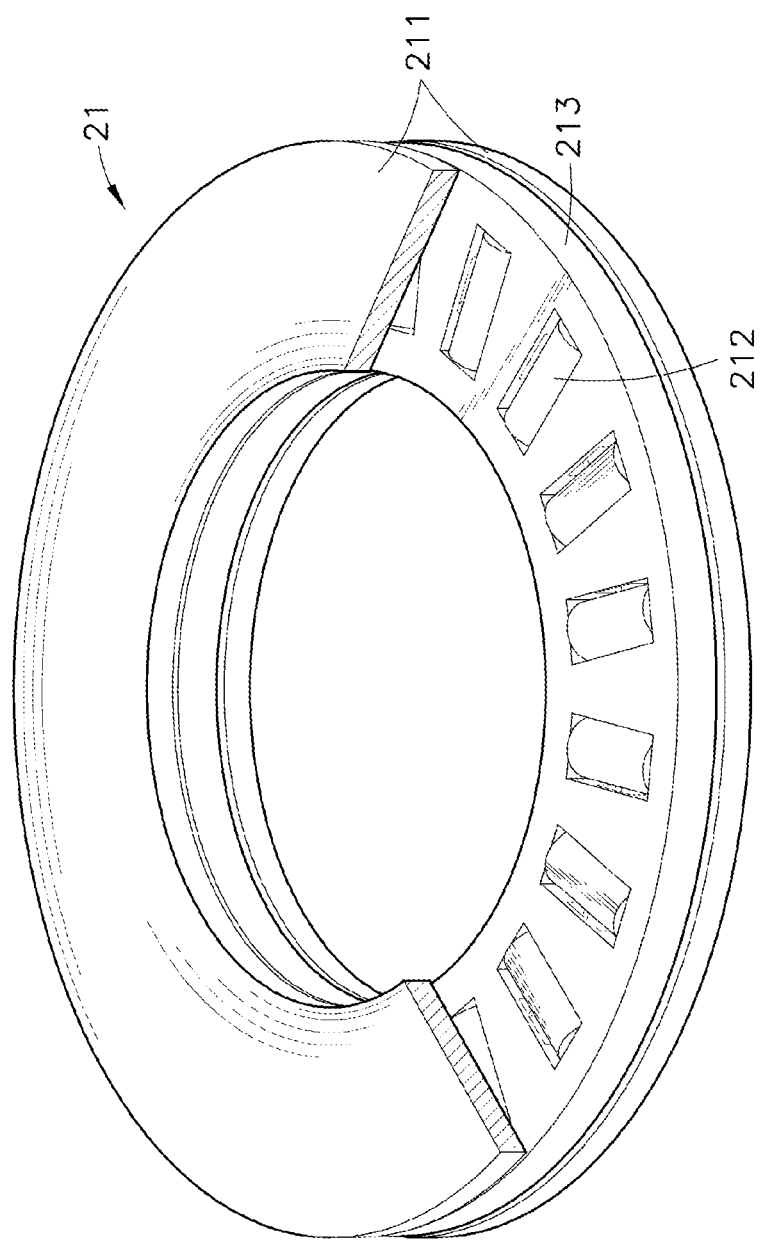
FIG. 6 is a sectional elevation in an enlarged scale of the thrust bearing of the invention.

Referring to FIGS. 1-6, an oblique top elevational view of an improved structure of linear actuator in accordance with the present invention, an exploded view of the improved structure of linear actuator, another exploded view of the improved structure of linear actuator, a sectional side view of the improved structure of linear actuator, an enlarged view of a part of the improved structure of linear actuator and a sectional elevation in an enlarged scale of the thrust bearing of the improved structure of linear actuator are shown. As illustrated, the improved structure of linear actuator comprises an actuator 1 and a stopping mechanism 2.

The actuator 1 comprises a hollow holder frame 11 consisting of two half shells and defining therein an accommodation chamber 10, an opening 101 at each of opposing top and bottom sides thereof and two locating grooves 112 that are respectively disposed in a middle part of the accommodation chamber 10 and the opening 101 at the bottom side of the accommodation chamber 10, a first connection member 111 connected to the opening 101 at the bottom side of the hollow holder frame 11, and a rolling bearing 113 and a one-way bearing 114 respectively mounted in the locating grooves 112 inside the accommodation chamber 10.

The actuator 1 further comprises a gear set 12 mounted in the accommodation chamber 10 and comprising a plastic driven gear (such as: worm gear) 121, which comprises a gear shaft 122 axially extended out of two opposite sides thereof at the center and respectively axially coupled to the center hole (not shown) of the rolling bearing 113 and the center hole (not shown) of the one-way bearing 114 and defining therein an axially extended positioning hole 1220, and a protruded friction portion 123 located at one side, namely, the bottom side thereof around the gear shaft 122.

The actuator 1 further comprises a driver 13 mounted on the inside (or outside) of the hollow holder frame 11 and comprising a motor 131 and a driving shaft (such as: worm) 132 inserted into the hollow holder frame 11 and engaged with the driven gear 121 of the gear set 12 and rotatable by the motor 131, and a transmission mechanism 14 coupled to the gear set 12 and drivable by the gear set 12 to rotate a lead screw 141 thereof. The lead screw 141 of the transmission mechanism 14 can be selectively arranged in a perpendicular or parallel manner relative to the motor 131.

The lead screw 141 of the transmission mechanism 14 has a bottom end thereof connected to the positioning hole 1220 of the gear shaft 122 of the driven gear 121. The actuator 1 further comprises a retractable tube assembly 15 threaded onto the lead screw 141 and axially movable in and out of the hollow holder frame 11 between an extended position and a received position. The retractable tube assembly 15 comprises a movable tube 151, a connection nut 152 and an outer tube 153. The movable tube 151 has one end thereof connected to the connection nut 152. The connection nut 152 comprises a screw hole 1521 threaded onto the lead screw 141, and a plurality of sliding guide blocks 1522 around the periphery thereof. The outer tube 153 is sleeved onto the movable tube 151, defining therein a plurality of longitudinal sliding groove 1531 that are respectively coupled to the sliding guide blocks 1522 of the connection nut 152 for enabling the movable tube 151 to be moved axially relative to the lead screw 141 between the extended position and the received position. Further, a second connection member 154 is connected to an opposite end of the movable tube 151 opposite to the connection nut 152.

The stopping mechanism 2 is mounted in the accommodation chamber 10 of the hollow holder frame 11 of the actuator 1, comprising a thrust bearing 21 disposed in the locating groove 112 in the bottom side of the hollow holder frame 11. The thrust bearing 21 comprises two track disks 211 mounted on the gear shaft 122 at the bottom side of the driven gear 121 at different elevations, and a roller holder disk 213 set between the two track disks 211, and a plurality of rolling elements 212 equiangularly and rotatably mounted in the roller holder disk 213 and respectively kept in contact with the track disks 211. The rolling elements 212 can be rolling balls, cylindrical rollers, tapered rollers, needle rollers, or the like.

The stopping mechanism 2 further comprises a receptacle 22 mounted in the locating groove 112 in the bottom side of the hollow holder frame 11 to hold the one-way bearing 114 and the thrust bearing 21 therein. The receptacle 22 comprises an open-top chamber 221 for the positioning of the one-way bearing 114, a recessed position-limit groove 222 located in a bottom side of the open-top chamber 221 for the positioning of the thrust bearing 21, a through hole 220 axially cut through the recessed position-limit groove 222 for the passing of a bottom end of the gear shaft 122 of the driven gear 121, a plurality of retaining ribs 2221 protruded from an inside wall thereof within the open-top chamber 221 for stopping against the periphery of the one-way bearing 114 to hold the one-way bearing 114 firmly in the open-top chamber 221, and a plurality of transverse tool holes 2222 transversely cut through the peripheral wall thereof in communication with the recessed position-limit groove 222. When wishing to remove the one-way bearing 114, the user can insert a hand tool into one transverse tool hole 2222 to lift the one-way bearing 114 out of the open-top chamber 221, facilitating one-way bearing 114 dismounting and replacement.

The actuator 1 is applicable to an external apparatus (such as electrical medical or home bed, massage chair, fitness machine, rehabilitation equipment, door/window opener, lifting mechanism or any other electrically controllable displacement device). In application, pivotally connect the first connection member 111 of the hollow holder frame 11 and the second connection member 154 of the retractable tube assembly 15 to a link or bracket of the external apparatus with screw bolts, pivot pins or like pivot-connection members. When the motor 131 of the driver 13 is started to rotate the driving shaft 132 and the meshed gear set 12, the lead screw 141 of the transmission mechanism 14 is rotated with the gear set 12, and the connection nut 152 of the retractable tube assembly 15 is forced to move linearly along the lead screw 141, moving the movable tube 151 out of or into the inside of the outer tube 153 and the hollow holder frame 11, and thus, the link or bracket of the external apparatus is moved by the second connection member 154 and the movable tube 151, achieving elevation or angular position adjustment.

During the operation of the driver 13 to extend out the retractable tube assembly 15, an inner race 1141 of the one-way bearing 114 is rotated with the gear shaft 122 of the gear set 12 relative to the fixed outer race (not shown) of the one-way bearing 114 in one direction (clockwise or counter-clockwise direction). When the driver 13 is stopped from moving the retractable tube assembly 15, the connection nut 152 of the retractable tube assembly 15 of the actuator 1 can be forced by the gravity weight of the external apparatus to impart a downward pressure to the lead screw 141 and to further reverse the gear set 12. At this time, the retractable tube assembly 15 can be forced to drop down; however, the structural design of the present invention eliminates the occurrence of this problem. At this time, the friction portion 123 of the gear set 12 will be forced to rub against the inner race 1141 of the one-way bearing 114, prohibiting the gear set 12 from reverse rotation and stopping the lead screw 141 positively in position.

Further, if the actuator 1 receives an impact due to a change in load or any other factor, the connection nut 152 of the retractable tube assembly 15 will be forced against the lead screw 141 of the transmission mechanism 14, causing the friction portion 123 of the gear set 12 to be abutted against the inner race 1141 of the one-way bearing 114, at this time, the inner race 1141 of the one-way bearing 114 will be stopped at the thrust bearing 21 of the stopping mechanism 2 to bear the axial thrust load and high impact load, avoiding actuator damage. Further, the receptacle 22, the one-way bearing 114 and the thrust bearing 21 can be arranged in a module, facilitating installation and providing enhanced axial thrust load and high impact load resistance. Further, the low friction characteristic of the thrust bearing 21 facilitates smooth rotation of the one-way bearing 114 and the driven gear 121. Because the thrust bearing 21 and receptacle 22 of the stopping mechanism 2 are mounted inside the hollow holder frame 11 without occupying any external space of the actuator 1, increasing the flexibility of the overall design and application of the linear actuator. Further, the one-way bearing 114 and the thrust bearing 21 are general specification products, they are easy and inexpensive to manufacture.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An improved structure of linear actuator, comprising:
an actuator comprising a hollow holder frame defining therein an accommodation chamber, a gear set mounted in said accommodation chamber, said gear set comprising a driven gear, said driven gear comprising a gear shaft and at least one friction portion at the periphery of said gear shaft, a one-way bearing mounted on said gear shaft for rubbing against said friction portion with an inner race thereof to brake said driven gear from reverse rotation, a driver mounted outside said hollow holder frame and adapted for driving said gear set, and a transmission mechanism disposed outside said hollow holder frame and coupled to said gear set, said transmission mechanism comprising a lead screw coaxially coupled to and rotatable by said gear shaft of said driven gear and a retractable tube assembly coupled to said lead screw and movable by said lead screw between an extended position and a received position; and
a stopping mechanism mounted in said accommodation chamber of said actuator, said stopping mechanism comprising a thrust bearing coupled to said gear shaft of said driven gear and stoppable against said inner race of said one-way bearing to bear an axial thrust load.

2. The improved structure of linear actuator as claimed in claim 1, wherein said actuator further comprises a first connection member mounted in an opening at a bottom side of said accommodation chamber and affixed to said hollow holder frame.

3. The improved structure of linear actuator as claimed in claim 1, wherein said hollow holder frame of said actuator comprises two locating grooves respectively disposed in a middle part of said accommodation chamber and said opening at a bottom side of said accommodation chamber; said actuator further comprises a rolling bearing and said one-way bearing respectively mounted in said locating grooves to support said gear shaft of said driven gear.

4. The improved structure of linear actuator as claimed in claim 3, wherein said stopping mechanism further comprises a receptacle mounted in the said locating groove in the said opening at the bottom side of said accommodation chamber, said receptacle comprising an open-top chamber for the positioning of said one-way bearing and a recessed position-limit groove axially located in a bottom side of said open-top chamber for the positioning of said thrust bearing.

5. The improved structure of linear actuator as claimed in claim 4, wherein said receptacle further comprises a plurality of retaining ribs disposed in said open-top chamber and stopped against the periphery of said one-way bearing, and a plurality of transverse tool holes transversely cut through the peripheral wall thereof in communication with said recessed position-limit groove.

6. The improved structure of linear actuator as claimed in claim 1, wherein said driver comprises a motor mounted on said hollow holder frame, and a driving shaft inserted into the inside of said holder frame and engaged with said driven gear of said gear set and rotatable by said motor.

7. The improved structure of linear actuator as claimed in claim 1, wherein said retractable tube assembly of said actuator comprises a movable tube, a connection nut connected to a bottom end of said movable tube and threaded onto said lead screw, and an outer tube surrounding said movable tube and affixed to said hollow holder frame for guiding axial movement of said movable tube along said lead screw, and a second connection member connected to an opposing top end of said movable tube opposite to said connection nut.

8. The improved structure of linear actuator as claimed in claim 1, wherein said thrust bearing of said stopping mechanism comprises two track disks, a roller holder disk disposed between said two track disks, and a plurality of rolling elements equiangularly and rotatably mounted in said roller holder disk and respectively disposed in contact with said track disks.

* * * * *